United States Patent
Sloat et al.

(10) Patent No.: US 12,190,750 B2
(45) Date of Patent: *Jan. 7, 2025

(54) PROSTHETIC ABDOMEN FOR PATIENT PERITONEAL DIALYSIS TRAINING

(71) Applicant: Fresenius Medical Care Holdings, Inc., Waltham, MA (US)

(72) Inventors: Daniel L. Sloat, Wakefield, MA (US); Mary Vasseur Finn, Ayer, MA (US)

(73) Assignee: FRESENIUS MEDICAL CARE HOLDINGS, INC., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,749

(22) Filed: Feb. 6, 2024

(65) Prior Publication Data

US 2024/0177630 A1 May 30, 2024

Related U.S. Application Data

(63) Continuation of application No. 18/199,990, filed on May 22, 2023, now Pat. No. 11,935,430, which is a continuation of application No. 17/155,668, filed on Jan. 22, 2021, now Pat. No. 11,694,577.

(51) Int. Cl.
*G09B 23/30* (2006.01)
(52) U.S. Cl.
CPC .................................. *G09B 23/303* (2013.01)
(58) Field of Classification Search
CPC ....... G09B 23/28; G09B 23/30; G09B 23/303
See application file for complete search history.

(56) References Cited

U.S. PATENT DOCUMENTS

| | | | |
|---|---|---|---|
| 4,531,919 A | 7/1985 | Ware | |
| 5,561,865 A | 10/1996 | Fjelstul | |
| 7,566,328 B2 | 7/2009 | Hooper | |
| 8,128,413 B2 | 3/2012 | Lynch | |
| 8,194,891 B2 | 6/2012 | Godart | |
| 8,944,825 B2 | 2/2015 | Reid-Searl et al. | |
| 9,737,095 B1 | 8/2017 | Kitelinger | |
| 11,600,200 B2 | 3/2023 | Hare | |
| 11,694,577 B2 | 7/2023 | Sloat et al. | |
| 2006/0223039 A1 | 10/2006 | Williams | |

(Continued)

FOREIGN PATENT DOCUMENTS

| | | |
|---|---|---|
| CN | 2751383 Y | 1/2006 |
| CN | 205451561 U | 8/2016 |

(Continued)

OTHER PUBLICATIONS

Sloat et al., Sleeping with a dummy-tummy, UXPA Conference, Boston, Massachusetts, Apr. 29, 2016.

(Continued)

*Primary Examiner* — Kurt Fernstrom
(74) *Attorney, Agent, or Firm* — Kilyk & Bowersox, P.L.L.C.

(57) ABSTRACT

A prosthetic abdomen for peritoneal dialysis training is provided. The prosthetic abdomen has an inner layer of material and an outer layer of material. The outer layer of material has an outer surface having a skin tone color. An opening is formed through the outer layer. A tube extends through the opening. A bag of liquid is in fluid communication with the tube extending through the opening.

18 Claims, 4 Drawing Sheets

(56) References Cited

U.S. PATENT DOCUMENTS

| | | |
|---|---|---|
| 2007/0243512 A1 | 10/2007 | King |
| 2012/0003621 A1 | 1/2012 | Segall |
| 2014/0051048 A1 | 2/2014 | Wooldridge |
| 2023/0290279 A1 | 9/2023 | Sloat et al. |

FOREIGN PATENT DOCUMENTS

| | | |
|---|---|---|
| CN | 210721923 U | 6/2020 |
| TW | 201421436 A | 6/2014 |

OTHER PUBLICATIONS

Redacted Photograph from UXPA Conference in Boston, Massachusetts, Apr. 29, 2016.

PROSTHETIC ABDOMEN FOR PATIENT PERITONEAL DIALYSIS TRAINING

CROSS-REFERENCE TO RELATED APPLICATIONS

This application is a continuation application of U.S. patent application Ser. No. 18/199,990, filed May 22, 2023, which in-turn is a continuation application of U.S. patent application Ser. No. 17/155,668, filed Jan. 22, 2021, both of which are incorporated herein in their entireties, by reference.

FIELD OF THE INVENTION

The present invention relates to peritoneal dialysis and training apparatus.

BACKGROUND OF THE INVENTION

Dialysis treatments are usually carried out on patients by a trained nurse or clinician at a clinic or hospital. More and more, dialysis patients are turning to home therapies and home treatments, enabling the patients to avoid the need, time, and costs involved with travelling to and receiving treatment at a clinic or hospital. Treatments are often prescribed to be carried out three times per week. Given the complexities of performing a dialysis treatment, proper training of patients before prescribing such self-therapies at home, is essential. In addition, the many learnings and psychological adjustments required for such a transition often induce learning-impeding stress.

There is a need and desire to provide home therapies for dialysis patients, particularly therapies that can be carried out by the patients themselves. There is also a need for a training apparatus and method for aiding patients in carrying out self-therapies, particularly at home, and for providing a practice device and method that enable the goal of relieving stress.

SUMMARY OF THE INVENTION

The present invention provides an improved training experience for beginning peritoneal dialysis patients. The prosthetic abdomen of the present invention, when worn by a patient, simulates a catheterized abdomen. Using the device mimics actual dialysis by adding tactile and reflective aspects to the training experience, thereby deepening and enhancing the effectiveness of the learning process and providing a safe apparatus and method for practicing the self-treatment of peritoneal dialysis.

The prosthetic device and method of the present invention enable a patient to psychologically adapt to having an abdominal catheter and makes the learning experience realistic.

The device and method can be implemented as patients learn how to use, for example, a STAY•SAFE® organizer and STAY•SAFE® cap, both available from Fresenius Medical Care North America, Waltham, Massachusetts. Patients can also learn how to carry out manual "exchanges" of fresh and spent peritoneal dialysis solutions and can learn how to use a cycler machine to administer their treatments. The device is also useful in training patients to practice special personal hygiene required of people having peritoneal catheters. Such training can include learning how to properly clean an exit site, how to keep an extension set clean when changing a STAY•SAFE® cap, or when incorporating the use of special catheter adaptors.

The prosthetic abdomen of the present invention can be used for peritoneal dialysis training. The prosthetic abdomen can be in the form of a belt, for example, having a consistent height along the entire length thereof. The height in the front of the belt can be from about three inches to about 10 inches and can be tailored based on the size of the abdomen of an expected user. The height of the belt, at least in the front, can be tailored or manufactured to be the same or about the same height as the abdomen of the user so as to mimic the size and shape of the user's abdomen. The ends of the belt can include wide fasteners such as patches of hook and loop fasteners so that the belt, when fastened around a user, is flush with the user's body. The belt fastener or fasteners can be low-profile so that the fasteners provide a comfortable fastening that is neither bulky nor protruding. The fastener or fasteners can have the same height as the rest of the belt so that fastening is provided at the ends of the belt and along the entire height of the belt.

The inner layer of material and outer layer of material can each comprise a stretchy, comfortable material that conforms to the user's abdomen and back and that feels and moves like the user's skin and body. A pouch formed in the front of the belt between the inner layer and outer layer can have a low-profile pouch fastener at or adjacent a top of the pouch. A plastic snap fastener can be used, or hook and loop fasteners can be used, to close the ouch and retain a bag of liquid therein.

The inner layer of material and the outer layer of material can be connected together, at least at or adjacent the bottom of the belt, to define a bottom of the pouch. The connection of the two layers can also provide a low-profile, for example, a line of stitching can be used. The outer layer of material, in particular, can comprise a stretchable material. The outer layer of material has an inner surface that partially defines the pouch, and an outer surface having a skin tone color that mimics the color of natural skin. The skin tone color can be selected from many to closely match the color of a particular patient for whom the prosthetic abdomen is particularly designed.

BRIEF DESCRIPTION OF THE DRAWINGS

The invention may be more fully understood with reference to the accompanying drawings. The drawings are intended to illustrate, not limit, the present teachings.

DETAILED DESCRIPTION OF THE INVENTION

Figure 1:
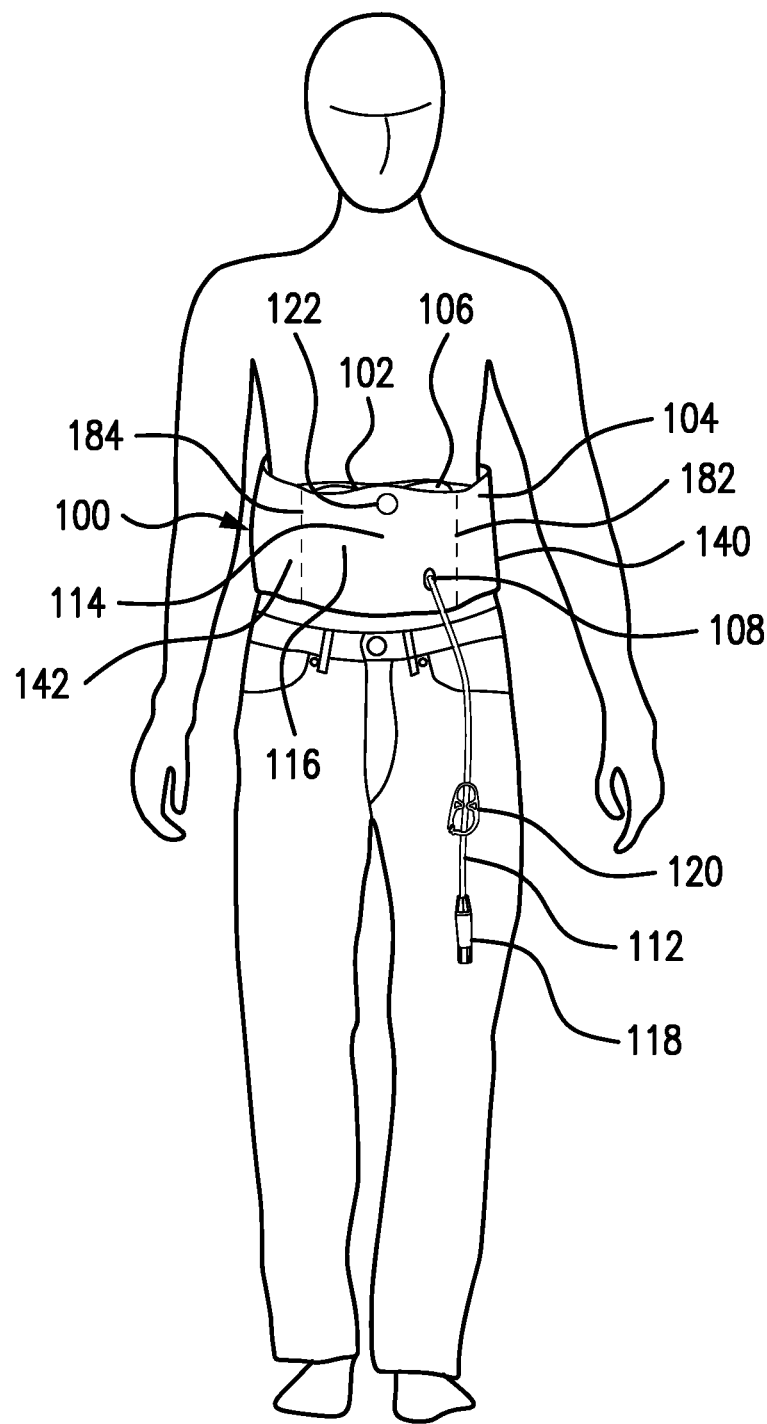
FIG. 1 is a front view of a prosthetic abdomen peritoneal dialysis (PD) trainer, including a catheter, as the trainer would be used on a patient and according to an embodiment of the present invention.

The present invention provides a prosthetic abdomen for peritoneal dialysis training. The prosthetic abdomen comprises a belt having a bottom, a top, a front, a front length, a total length, and a height. Along the front length, the height of the belt can be six inches or longer, for example, at least eight inches, at least ten inches, at least 12 inches, at least 15 inches, from eight inches to 25 inches, from ten inches to 20 inches, from 12 inches to 18 inches, or the like. Depending on the size of the patient for whom the prosthetic abdomen is intended, the length of the front can vary. For a very large patient, for example, having a waist size of greater than 40 inches, the front of the belt can be 18 inches or longer, or 20 inches or longer. The total length of the belt can be at least 20 inches, at least 24 inches, at least 28 inches, at least 32 inches, at least 36 inches, from 20 inches to 50 inches, from 24 inches to 48 inches, from 26 inches to 44 inches, from 28 inches to 40 inches, or the like.

The belt can have a height of at least three inches along the front length, for example, a height of four inches, a height of 5 inches, a height of from three inches to eight inches, a height of from four inches to six inches, or the like. The height of the remainder of the belt does not necessarily need to be the same as the height at the front of the belt. Besides the height at the front of the belt, the remainder of the belt can have a height of one inch, two inches, three inches, or more. The height of the remainder of the belt can be shorter than the height at the front of the belt.

The belt also has a first end, a second end, an inner layer of material, and an outer layer of material. The inner layer of material, the outer layer of material, or both, can be made of a stretchable material. The inner layer, outer layer, or both, can comprise any suitable material. Exemplary materials that can be used include cotton, linen, spandex, polyester, rayon, nylon, ragadon, elastone, modal, silk, satin, leather, LYCRA® (E. I. DU PONT DE NEMOURS AND COMPANY), Wilmington, Delaware, bamboo, hemp, dry-fit materials, wicking materials, breathable materials, blends of such materials, and the like materials. Organic materials can be used. The material can be comfortable. As an example, the inner layer of material can comprise cotton, polyester, nylon, spandex, LYCRA©, a foamed neoprene material, a textile material, a blend of materials, a cotton-polyester blend material, a nylon-spandex blend material, or the like. As a further example, the inner layer of material can comprise at least one of a nylon-spandex blend material and a foamed neoprene material. As an example, the outer layer of material can comprise cotton, polyester, nylon, spandex, LYCRA®, a foamed neoprene material, a textile material, a blend of materials, a cotton-polyester blend material, a nylon-spandex blend material, or the like. As a further example, the outer layer of material can comprise at least one of a nylon-spandex blend material, a foamed neoprene material, a polyester material, a cotton-polyester blend material, or the like. The outer layer of material can comprise a stretchable material.

A pouch is formed in the front of the belt between the inner layer of material and the outer layer of material. Herein, the pouch is also referred to as a peritoneum pouch. A through-hole can be formed through the outer layer of material, at the pouch. A midline at the front of the belt can be defined at half of the height at the front. A centerline at the front of the belt can be defined in the center of the front, in the center of the pouch, or both. The centerline can extend form the bottom of the belt, at the front, to the top of the belt, at the front. A pouch fastener can be provided at or adjacent a top of the pouch, for example, along the center line of the pouch at the top. A belt fastener or complementary belt fasteners can be provided at or adjacent at least one of the first end and the second end. The fastener or fasteners can be configured for fastening the first end and the second end together.

The through-hole can have a dimeter that is large enough or stretchable enough to enable a catheter to be fed through the through-hole, from the pouch, to outside of the pouch. The through-hole can be at least ¹⁄₁₆ inch in diameter, at least ⅛ inch in diameter, at least ¼ inch in diameter, or the like. Instead of a through-hole, a slit or other opening can be provided in the outer of layer of material at the pouch. The through-hole or opening can be positioned at or below the midline of the belt.

The inner layer of material and the outer layer of material can be connected together at or adjacent the bottom of the belt to define a bottom of the pouch. The outer layer of material can have an inner surface partially defining the pouch, and an outer surface having a skin tone color. The outer layer of material can be stretchable and the pouch can be expandable. The pouch, for example, can expand to hold a volume of at least 1000 milliliters (ml), for example, at least 1500 ml, at least 2000 ml, at least 2500, from 1000 ml to 4000 ml, from 2000 ml to 3000 mil, or from 2400 ml to 2600 ml. The skin tone can be selected from beige, tan, brown, black, peach, or the like. A bag of liquid can be provided in the pouch. The bag of liquid can contain a volume of at least 1000 ml of liquid. The bag can comprise a catheter or tube extending therefrom, and the catheter or tube can extend from the bag and through the opening such that the catheter or tube extends to outside of the pouch. The opening can be a through-hole having a diameter that is the same size as the outer diameter of the catheter or tube.

The belt fastener or complementary belt fasteners can comprise one or more of a hook and loop fastener, a button, a zipper, a snap fastener, a magnetic fastener, a safety pin, and a lace. The pouch fastener can comprise one or more of a hook and loop fastener, a button, a zipper, a snap fastener, a magnetic fastener, a safety pin, and a lace. According to various embodiments, the belt fastener can comprise a hook fastener at one of the first end and the second end, a loop fastener at the other of the first end and the second end, and the pouch fastener can comprise a snap fastener.

An exemplary pouch fastener has good holding power yet is neither bulky nor with sharp or stabbing edges. Traditional buttons can be used. The pouch fastener can comprise a pair of inter-locking buttons or discs, such as a snap fastener. A circular lip under one disc can fit into a groove on the top of the other, holding them fast until a certain amount of force is applied. Different types of snaps can be attached to fabric the inner and outer layers of the belt by riveting with a punch and die set, for example, a set specific to the type of rivet snaps used. A striking action can be used on the punch using, for example, a hammer, to splay the tail. Sewing or plying with special snap pliers can also be used. The snap fastener can be made out of a metal or plastic.

The inner layer of material and the outer layer of material can be connected together by a line of stitching, by adhesive, or the like, to define the bottom of the pouch. The inner layer of material and the outer layer of material can be connected together along first and second vertical seams to define left and right inside edges of the pouch. The vertical seams can comprise lines of stitching, lines of adhesive, lines of fasteners, lines of rivets, a combination thereof, or the like. Lines of stitching can be used to connect the inner layer and outer layer together. Lines of stitching can be used to define edges and a bottom of the pouch.

Nylon or other synthetic thread can be used for the stitching. Cotton thread can be used for the stitching, or any other suitable thread material. A double line of stitching can be used. Instead of, or in addition to, lines of stitching, delimiting lines can be formed using textile adhesive, fabric adhesive, hot glue gun adhesive, other adhesive, heat-bonding, heat-welding, melt-forming, other welding methods, staples, rivets, combinations thereof, and the like. Any of various commercially available fabric adhesives, stretchable or not, can be used.

Nylon or other synthetic thread can be used for the stitching to delineate the pouch edges and pouch bottom in the belt. Cotton thread can be used for the stitching, or any other suitable thread material. A double line of stitching can be used. Other methods and devices can be used to delineate the pouch edges and pouch bottom in the belt. Instead of, or in addition to, lines of stitching, delimiting lines can be formed using textile adhesive, fabric adhesive, hot glue gun adhesive, other adhesive, heat-bonding, heat-welding, melt-forming, other welding methods, staples, rivets, combinations thereof, and the like. Any of various commercially available fabric adhesives, stretchable or not, can be used.

The inner layer of material can have an inner surface that partially defines the pouch, and an outer surface, at the inside of the belt, intended to contact a patient's skin. The outer surface of the inner layer of material can comprise at least one of a nylon-spandex blend material, a foamed neoprene material, an elastomeric material, elastomeric strips or patches, a combination thereof, or the like. The material can conform smoothly to a user's skin and body shape.

The pouch has a top opening. The inner layer of material and the outer layer of material can be connected together by a line of stitching along substantially the entire bottom of the belt. The inner layer of material and outer layer of material can be connected together along substantially the entire top of the belt except at the top opening of the pouch. In an example, the pouch is expandable to hold a 2500 ml, or larger, bag of liquid, a 2500 ml or larger bag of liquid is disposed in the pouch, and the bag of liquid in the pouch contains peritoneal dialysis solution. One or more side pouches can be provided, adjacent the pouch, and each can hold one or more weights intended to mimic the excess weight a patient would need to carry after a peritoneal dialysis fill step.

According to one or more embodiments of the present invention, a prosthetic abdomen as described herein can be fastened around a patient. The front of the prosthetic abdomen can rest against the abdomen of the patient. The patient has a skin tone and the skin tone color of the outer surface of the outer layer of material can be selected to match the skin tone of the patient. Different prosthetic abdomens of different skin tone colors can be compared to the patient's skin tone so that a closest-match skin tone color can be selected.

A method of training a patient on how to self-perform a peritoneal dialysis treatment on the patient, is also provided according to embodiments of the present invention. The method can comprise placing the prosthetic abdomen around the abdomen of the patient such that the front of the prosthetic abdomen rests against the abdomen of the patient. The method can include wrapping the first end and the second end around the patient and fastening the first end and the second end together at the back of the patient. The method can comprise placing an empty bag, having a catheter attached thereto, into the pouch. The catheter can then be threaded through the through-hole. The method can entail feeding liquid into the empty bag, while the empty bag is in the pouch. The feeding liquid can comprise feeding the liquid through the catheter. The feeding can be continued to fill the bag, form a filled bag, and mimic a peritoneal dialysis fill step.

Feeding can entail the same methods and devices as are used to fill a peritoneum for a peritoneal dialysis treatment. A bag of peritoneal dialysis solution, substitute fluid, training fluid, water, saline, or the like, can be hung from a stand, for example, an intravenous stand as is used for infusing peritoneal dialysis solution into a peritoneum or for infusing saline into a vein via an intravenous drip line. The catheter can be connected to a port at the bottom of the fluid-filled bag, a clamp along the catheter can be opened, and, via gravity, the peritoneal dialysis solution or another fluid can drain from the fluid-filled bag, through the catheter, and into an empty bag positioned within the pouch of the prosthetic abdomen.

Feeding a peritoneal dialysis solution or other fluid into the prosthetic abdomen can comprise pumping the fluid into an empty bag positioned within the pouch of the prosthetic abdomen. The catheter can fluidly connect a reservoir of peritoneal dialysis solution or other fluid, to an empty bag positioned within the pouch of the prosthetic abdomen. A clamp can be provided along the catheter line. The reservoir can be a bag, jug, jar, or other container. A pump can be provided to pull or push fluid from the reservoir into the empty bag. The pump can comprise a peristaltic pump, a piston pump, a rotary pump, a centrifugal pump, an impeller pump, or the like. The pump can comprise a peristaltic pump arranged along the catheter. Valving and clamps can be provided and used. A stepper motor can be used to control fluid flow through the catheter and into the empty bag in the prosthetic abdomen. A flow meter can be provided along or in connection with the catheter, or along a separate fluid feed line leading to the catheter. A control unit can start fluid flow, control fluid flow, stop fluid flow, and the like. A clamp along the catheter can be opened to enable peritoneal dialysis solution or another fluid to be removed from the reservoir and moved to the bag in the prosthetic abdomen.

Subsequently, the filled bag can be drained through the catheter, while the filled bag remains in the pouch, to empty the bag and mimic a peritoneal dialysis drain step. Gravity, a pump, or both can be used for the draining. The training method can further comprise waiting at least ten minutes between the filling step and the draining step to mimic a peritoneal dialysis dwell step.

The catheter can have a distal end and a cap closing the distal end and the method can further comprise removing the cap prior to the filling. The method can comprise installing the cap on the distal end after the filing. The method can comprise removing the cap for a second time prior to the draining. The method can comprise cleaning the distal end of the catheter prior to the filling. The catheter can include a catheter clamp thereon and the method can further comprise opening the catheter clamp prior to the filling. The method can comprise closing the catheter clamp after the filling. The method can comprise opening the catheter clamp for a second time, prior to the draining.

According to one or more embodiments of the present invention, the prosthetic device is essentially a wide belt worn around the waist that includes a pouch, as shown in FIG. 1. The pouch is intended to represent a human peritoneal cavity. The belt is comprised of two primary layers, for example, made from a stretchable material, such as a spandex-nylon blend or a foamed neoprene material. The outer layer can serve the cosmetic purpose of looking like real human skin. The outer layer can be made of a material similar to artificial human skin, for example, a material that is able to give and stretch consonant with the other layers. The outside surface of the outer layer can be provided in any of a number of different skin tone colors. The skin tone color selected can match different patient populations. Moles, freckles, tattoos, scars, combinations thereof, and the like can be added to the outside surface to replicate a particular skin and individual.

The two primary layers can be sewn together. Vertical seams can be provided to create edges of the pouch. The pouch can be large enough to accommodate a standard size bag of dialysate, for example, about 2500 ml. The material of the two layers together should be strong enough to carry the weight of a full bag of dialysate while being flexible enough to expand and contract with the inflow and outflow of 2500 ml of fluid. The pouch can include one or more plastic snaps or other fasteners to keep the pouch closed and to maintain the bag in place. The belt can have large strips of hook and loop fasteners on the ends thereof for fastening the belt around a waist. VELCRO® (available from Velcro BVBA, Deinze, Belgium) can be used.

The two primary layers can be connected together by hook and loop fasteners. Vertical seams can be provided with hook and loop fasteners to create edges of the pouch. The pouch can be large enough to accommodate a standard size bag of dialysate, for example, about 2500 ml. The material of the two layers together, and the holding strength of the hook and loop fasteners, can be strong enough to carry the weight of a full bag of dialysate while being flexible enough to expand and contract with the inflow and outflow of 2500 ml of fluid. The pouch can include one or more hook and loop fasteners to keep the pouch closed and to maintain the bag in place.

The two primary layers can be in the form of a single layer that is folded over on itself. The inside of the fold can comprise the inside bottom of the pouch. The bottom of the pouch would not have to be defined by a thread line. The bottom of the pouch can be reinforced. Vertical seams can be provided to create edges of the pouch. The pouch can be large enough to accommodate a standard size bag of dialysate, for example, about 2500 ml. The material of the layer folded over on itself can be strong enough to carry the weight of a full bag of dialysate while being flexible enough to expand and contract with the inflow and outflow of 2500 ml of fluid. The pouch can include one or more plastic snaps or other fasteners to keep the pouch closed and to maintain the bag in place.

The prosthetic abdomen of the present invention can be used for training patients for peritoneal dialysis, and can also be used for training physicians, nurses, clinicians, physician assistants, family members, loved ones, friends, and other caregivers. The training of physicians, nurses, clinicians, physician assistants, and other caregivers can be helpful not only to provide experience with carrying out or assisting with a peritoneal dialysis procedure, but also for empathic modeling, for example, helpful in carrying out Extreme UX methods. Through the use of the prosthetic abdomen, including, for example, wearing the prosthetic abdomen and filling and draining the prosthetic abdomen, physicians, nurses, clinicians, physician assistants, family members, loved ones, friends, and other caregivers can better understand a trainee's situation and what the trainee would be or is going through and experiencing. Such exposure to such a realistic training tool can help others to better empathize with a trainee or patient. Methods of empathic training of physicians, nurses, clinicians, physician assistants, other caregivers, family members, loved ones, friends, and other caregivers are also provided by the present invention and can involve using the prosthetic abdomen to simulate a peritoneal dialysis procedure.

FIG. 1 shows a prosthetic abdomen 100 for peritoneal dialysis training. Prosthetic abdomen 100 comprises a peritoneum pouch 102 for holding a dialysate solution bag 106. Prosthetic abdomen 100 can be used for simulating Fill, Dwell, and Drain stages of peritoneal dialysis, in accordance with the present invention. As shown in FIG. 1, prosthetic abdomen 100 comprises a belt 104 having a front 114 including an outer surface 116 that can be colored or made of a colored material that mimics a skin tone color. In belt front 114 a through-hole 108 is provided through which a catheter 112 can extend from dialysate solution bag 106 to a distal end that is capped with a threaded cap 118. A catheter clamp 120 is provided on catheter 112 for clamping closed catheter 112. A snap fastener 122 is provided for maintaining dialysate solution bag 106 inside peritoneum pouch 102.

Figure 2:
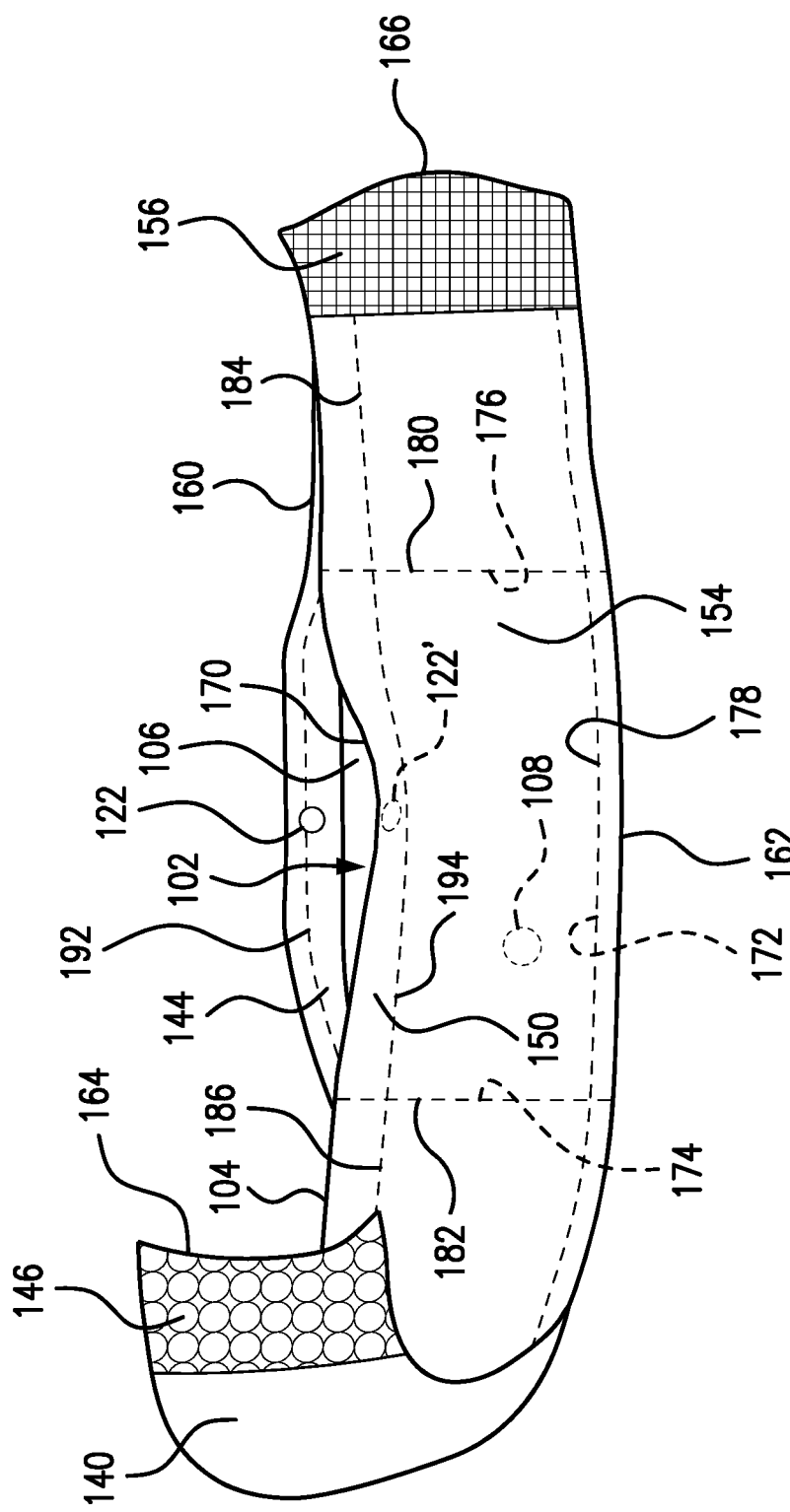
FIG. 2 is a back view of the inside surface of the prosthetic abdomen PD trainer shown in FIG. 1, but detached from the patient and without the catheter and solution bag.
Figure 3:
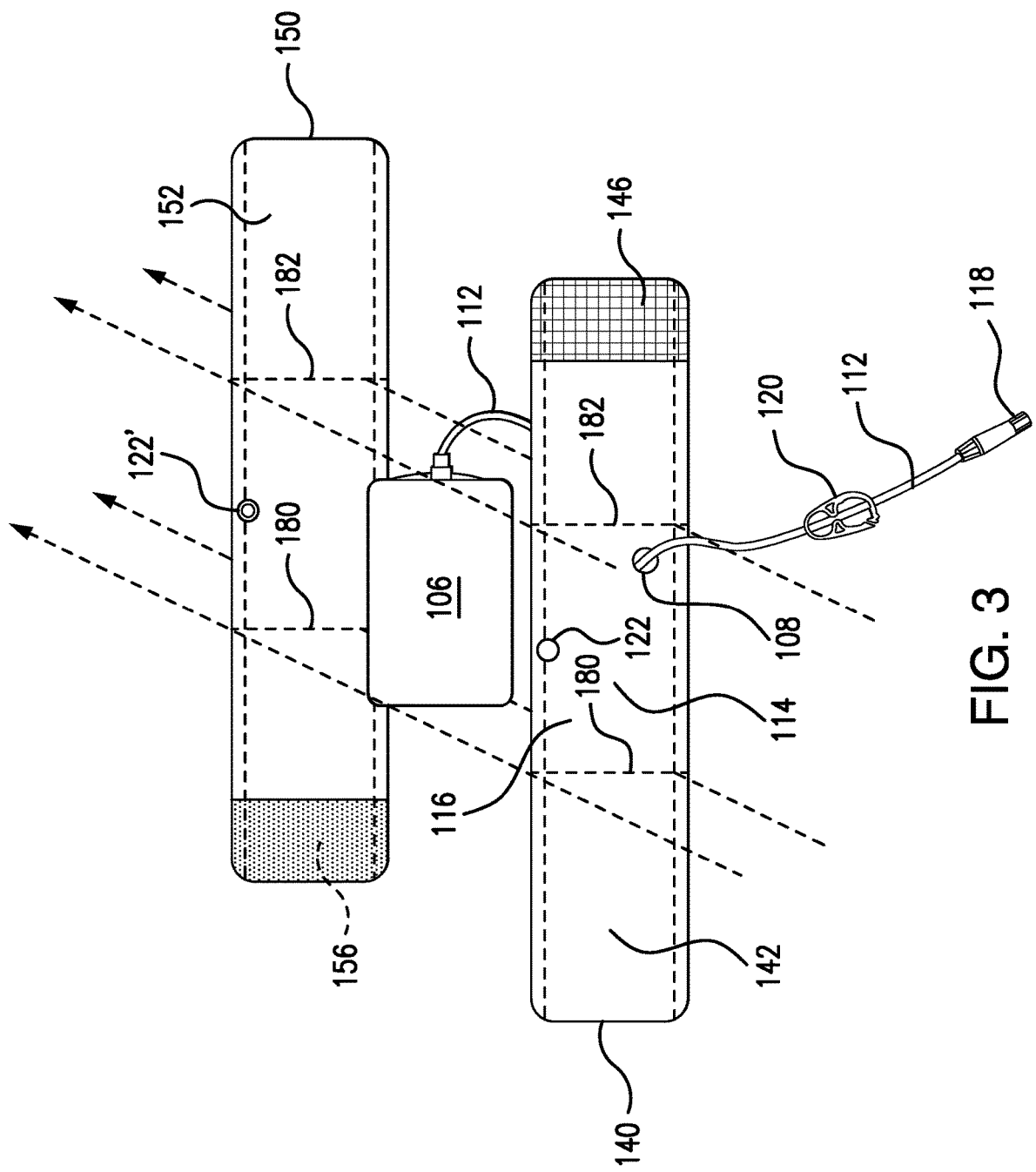
FIG. 3 is an exploded front view of the prosthetic abdomen PD trainer shown in FIG. 2, along with a solution bag and attached catheter, showing the pouch wherein the solution bag is held and showing the stitch lines used to construct the assembled device according to an embodiment of the present invention.
Figure 4:
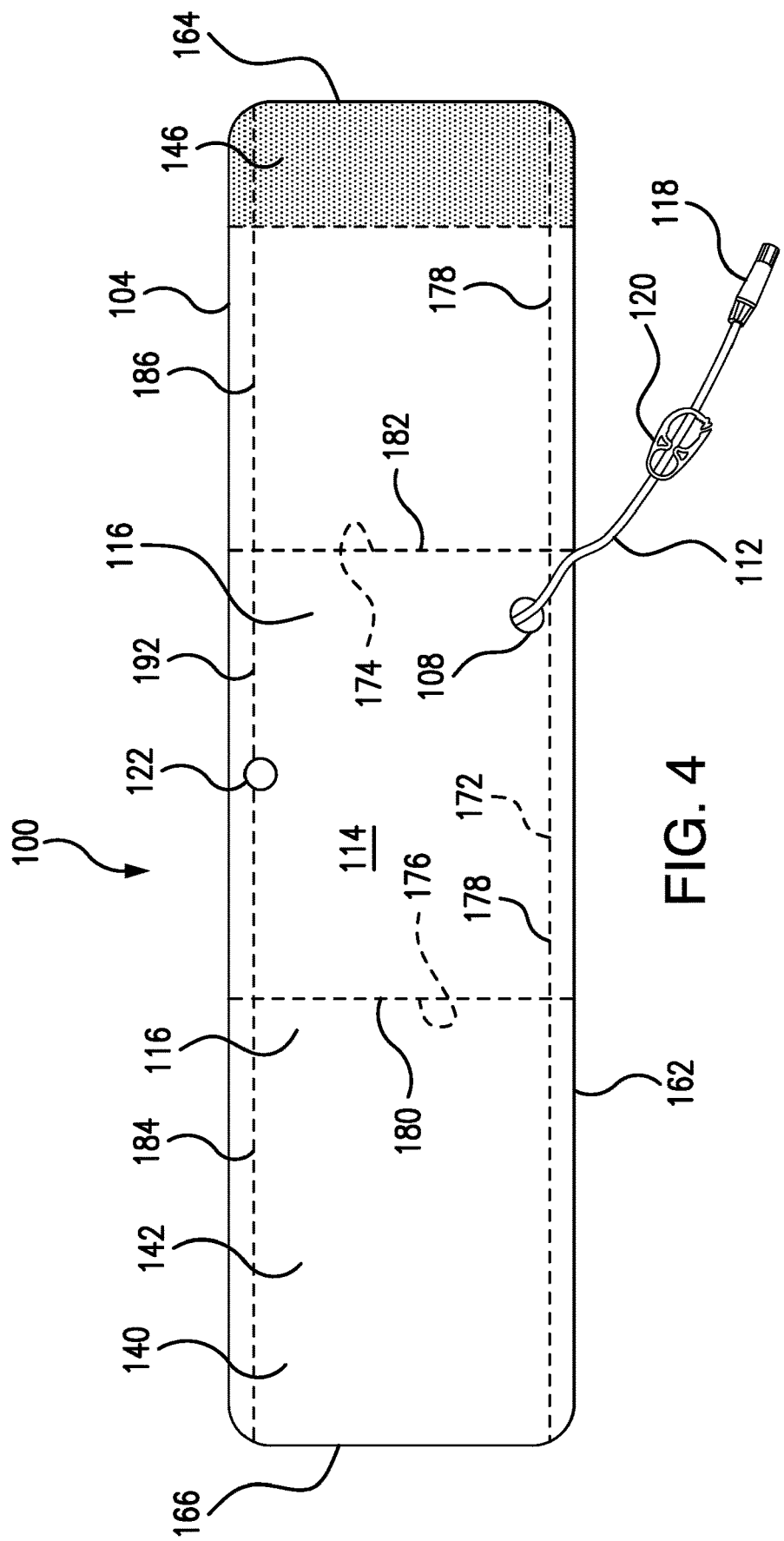
FIG. 4 is a flat front view of the assembled prosthetic abdomen PD trainer shown in FIG. 2.

As best seen in FIGS. 2-4, belt 104 comprises an outer layer of material 140 and an inner layer of material 150. Outer layer of material 140 has an outer surface 142 that includes outer surface 116 of belt front 114. Outer surface 142 of outer layer of material 140 includes a patch of loop fasteners 146. Outer layer of material 140 also has an inner surface 144 that partially defines the inside of peritoneum pouch 102.

Inner layer of material 150 has an inner surface 152 that partially defines the inside of peritoneum pouch 102. Inner layer of material 150 also has an outer surface 154 that is intended to contact the abdomen of a patient. Outer surface 154 of inner layer of material 150 includes a patch of hook fasteners 156 configured to engage and fasten to loop fasteners 146 when belt 104 is wrapped around the abdomen of a trainee.

Belt 104 has a top 160, a bottom 162, a first end 164, and a second end 166. Belt 104 has an outer surface defined by outer surface 142 of outer layer of material 140. Belt 104 has an inner surface defined by outer surface 154 of inner layer of material 150.

Peritoneum pouch 102 has a top 170, a bottom 172, a right edge 174, and a left edge 176. A line of stitching 178 is provided, stitching together outer layer of material 140 and inner layer of material 150. In addition to holding together the layers, line of stitching 178 also defines bottom 172 of peritoneum pouch 102. Vertical lines of stitching 180 and 182 also hold together outer layer of material 140 and inner layer of material 150 and further define left and right inside edges, respectively, of peritoneum pouch 102, when viewed from the front. Lines of stitching 184 and 186 are provided to further hold outer layer of material 140 and inner layer of material 150 together, but terminate at vertical seams 180 and 182, respectively. Lines of stitching 192 and 194 provide top of peritoneum pouch 170 with a folded-over, double layer of material on the outer layer of material 140 and on the inner layer of material 150, respectively.

As can be seen in FIGS. 2 and 3, snap fastener 122 is fixed to inside surface 144 of outer layer of material 140. Snap fastener 122 is configured to snap together with a snap fastener receiver 122' that is provided on inner surface 152 of inner layer of material 150. A low-profile plastic snap fastener can be used.

The entire contents of all references cited in this disclosure are incorporated herein in their entireties, by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether such a range is separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All patents, patent applications, and publications mentioned herein are incorporated herein in their entireties, by reference, unless indicated otherwise.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A prosthetic abdomen for peritoneal dialysis training, comprising:
    an inner layer of a first material;
    an outer layer of a second material;
    an opening formed through the outer layer;
    a tube extending through the opening; and
    a bag of liquid in fluid communication with the tube extending through the opening, wherein
    the outer layer of second material has an outside surface that has a skin tone color.

2. The prosthetic abdomen of claim 1, further comprising a pouch, wherein the inner layer of first material has a bottom edge, the outer layer of second material has a bottom edge, and the inner layer of first material and the outer layer of second material are connected together at or adjacent the bottom edge of the inner layer of first material and at or adjacent the bottom edge of the outer layer of second material, to define a bottom of the pouch.

3. The prosthetic abdomen of claim 2, wherein the pouch is expandable.

4. The prosthetic abdomen of claim 2, wherein the pouch is expandable to hold a volume of at least 1000 milliliters (ml).

5. The prosthetic abdomen of claim 2, wherein the bag of liquid is inside the pouch.

6. The prosthetic abdomen of claim 1, wherein the bag contains at least 1000 ml of the liquid.

7. The prosthetic abdomen of claim 1, wherein the opening comprises a through-hole having a diameter of at least ⅛ inch.

8. The prosthetic abdomen of claim 1, further comprising a belt fastener configured to fasten the prosthetic abdomen to an abdomen of a user.

9. The prosthetic abdomen of claim 8, wherein the belt fastener comprises a first end, a second end, a first fastener at the first end, and a second fastener at the second end, and the first fastener and the second fastener are configured to fasten together.

10. The prosthetic abdomen of claim 1, wherein the inner layer of first material and the outer layer of second material are connected together by a line of stitching.

11. The prosthetic abdomen of claim 1, wherein the inner layer of first material and the outer layer of second material are connected together along seams to define left and right inside edges of a pouch.

12. The prosthetic abdomen of claim 11, wherein the seams are vertical seams.

13. The prosthetic abdomen of claim 1, wherein the inner layer of first material has an inner surface that partially defines a pouch, and an outer surface intended to contact a user's skin, and the outer surface of the inner layer of first material comprises at least one of a nylon-spandex blend material and a foamed neoprene material.

14. The prosthetic abdomen of claim 1, wherein the outer layer of second material has a centerline, and the opening is offset from the centerline.

15. The prosthetic abdomen of claim 1 resting against an abdomen such that the outer surface of the outer layer of second material is exposed, wherein the abdomen has a skin tone color, and the skin tone color of the outer surface of the outer layer of second material matches the skin tone color of the abdomen.

16. A method of training a user on how to perform peritoneal dialysis on the user, the method comprising:
    placing the prosthetic abdomen of claim 1 on the abdomen of the user such that the prosthetic abdomen rests against the abdomen of the user;
    extending the tube through the opening; and
    draining the bag of liquid through the tube to empty the bag of liquid and mimic a peritoneal dialysis drain step.

17. The method of claim 16, wherein the tube has a distal end and a cap closing the distal end, and the method further comprises:
    removing the cap prior to the draining.

18. The method of claim 16, wherein the tube includes a catheter clamp thereon, and the method further comprises:
    opening the catheter clamp prior to the draining.

* * * * *